United States Patent [19]

Chandra et al.

[11] 3,960,810

[45] June 1, 1976

[54] COATING PROCESS

[75] Inventors: Grish Chandra, Glamorgan, Wales; Colin Mostyn Rowland, Brussels, Belgium

[73] Assignee: Dow Corning Limited, Barry Glamorgan, Wales

[22] Filed: Apr. 10, 1975

[21] Appl. No.: 566,857

Related U.S. Application Data

[62] Division of Ser. No. 479,245, June 14, 1974, Pat. No. 3,928,629.

[52] U.S. Cl. ................ 260/46.5 UA; 260/46.5 G; 260/46.5 H
[51] Int. Cl.² ........................................ C08G 77/04
[58] Field of Search ............................. 260/46.5 UA; 260/46.5 G

[56] References Cited
UNITED STATES PATENTS 3,296,291   1/1967   Chalk et al. ............ 260/46.5 UA X

*Primary Examiner*—Lewis T. Jacobs
*Attorney, Agent, or Firm*—Robert F. Fleming, Jr.

[57] ABSTRACT

Process for coating a surface with an organosiloxane composition to render it non-adherent. The organosiloxane composition is substantialy solvent-free, has a viscosity not exceeding 4,000 cS at 25°C and comprises (1) a polydiorganosiloxane having silicon-bonded vinyl radicals (2) an organohydrogenpolysiloxane and (3) a catalyst which is

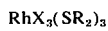

or

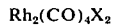

in which X is halogen, preferably chlorine, and each R is alkyl, aryl, aralkyl, alkaryl or R'$_3$SiQ wherein Q is a divalent aliphatic hydrocarbon radical and R' is alkyl, aryl, aralkyl or alkaryl or (CH$_3$)$_3$Si-. After application the composition is cured.

4 Claims, No Drawings

COATING PROCESS

This is a division of application Ser. No. 479,245, filed June 14, 1974, now U.S. Pat. No. 3,928,629 issued Dec. 23, 1975.

This invention relates to an improved process and composition for rendering surfaces non-adherent.

In German Offenlegungsschrift 2 210 380 there is described a process for coating a surface which comprises applying thereto a composition having a viscosity not exceeding 4000 cS at 25°C and comprising (1) a polydiorganosiloxane having a viscosity in the range from 50 to 4000 cS at 25°C wherein from 0.1 to 5 per cent of the total silicon-bonded radicals are vinyl radicals, at least 80 per cent of the remaining silicon-bonded radicals being methyl radicals, (2) an organopolysiloxane having therein silicon-bonded hydrogen atoms and silicon-bonded organic radicals selected from methyl, ethyl and phenyl radicals, there being in the molecule on average at least three silicon-bonded hydrogen atoms, and (3) a catalyst for the addition of $\equiv$ SiH groups to $\equiv$ Si vinyl groups, the ratio of silicon-bonded hydrogen atoms in (2) to silicon-bonded vinyl radicals in (1) being at least 0.5:1, and thereafter curing the applied composition.

According to said Offenlegungsschrift the preferred catalysts (3) are the platinum compounds and complexes thereof. The platinum compounds and complexes, however, have the disadvantage that the coating compositions containing them have a limited useful bath life after the essential components have been mixed together. Although the bath life of the compositions can be increased by including therein a substance which inhibits the activity of the platinum catalyst such a remedy also reduces the rate at which the composition cures.

We have now found that an improved method of carrying out the process described in Offenlegungsschrift 2 210 380 resides in employing as the catalyst (3) one or more of certain complexes of rhodium. When the said rhodium complexes are used as the catalysts, compositions having useful bath lives can be obtained in the absence of an added inhibiting substance. At the same time compositions containing the rhodium complexes have, in general, improved curing characteristics when compared with those containing an inhibited platinum catalyst.

According to the invention there is provided a process for coating a surface which comprises applying thereto a composition having a viscosity not exceedng 4000 cS at 25°C and comprising (1)a polydiorganosiloxane having a viscosity in the range from 50 to 4000 cS at 25°C wherein from 0.1 to 15 per cent of the total silicon-bonded radicals are vinyl radicals, there being at least two vinyl radicals per molecule and at least 80 per cent of the remaining silicon-bonded radicals being methyl radicals, (2) an organohydrogenpolysiloxane having therein silicon-bonded hydrogen atoms and silicon-bonded organic radicals selected from methyl, ethyl and phenyl radicals, there being in the molecule on average at least three silicon-bonded hydrogen atoms and no more than 20 molar per cent of copolymeric diorganosiloxane units, and (3) a catalyst for the addition of $\equiv$ SiH groups to silicon-bonded vinyl groups, said catalyst comprising one or more complexes of rhodium having the general formula $$RhX_3(SR_2)_3 \qquad (i)$$

or $$Rh_2(CO)_4X_2 \qquad (ii)$$

wherein each X represents a halogen atom and each R represents an alkyl, aryl, aralkyl or alkaryl radical having from 1 to 8 inclusive carbon atoms or the $R'_3SiQ$- group in which Q represents a divalent aliphatic hydrocarbon radical having from 1 to 6 inclusive carbon atoms and R' represents an alkyl, aryl, aralkyl or alkaryl radical having from 1 to 8 inclusive carbon atoms or a $(CH_3)_3Si$- group, not more than one R' per molecule being $(CH_3)_3Si$—, the ratio of silicon-bonded hydrogen atoms provided by (2) to silicon-bonded vinyl radicals provided by (1) being at least 0.5:1; and thereafter curing the applied composition.

As component (1) of the compositions used according to this invention there are employed polydiorganosiloxanes having a viscosity within the range from 50 to 4000 cS, preferably from 100 to 700 cS at 25°C. The polydiorganosiloxanes are preferably those having from 1.95 to 2.01 organic radicals per silicon atom. From 0.1 to 15 per cent, preferably from 0.1 to 5 per cent, of the total number of organic radicals in the polydiorganosiloxane are vinyl radicals, there being at least 2 vinyl radicals per molecule, and at least 80 per cent of the remaining silicon-bonded radicals are methyl radicals. Any remaining radicals in the polydiorganosiloxane may be any type of organic radical free of aliphatic unsaturation provided they do not affect deleteriously the catalytic activity of ingredient (3) of the composition or sterically hinder the SiH/Si vinyl addition reaction. Any remaining radicals may therefore be for example, monovalent hydrocarbon or halogenated hydrocarbon radicals free of aliphatic unsaturation such as alkyl and cycloalkyl radicals, e.g. ethyl, propyl, decyl, tetradecyl, eicosyl and cyclohexyl, aryl radicals e.g. phenyl and naphthyl and haloalkyl and haloaryl radicals, e.g. bromophenyl and 3,3,3-trifluoropropyl. The polydiorganosiloxanes (1) may if desired be end stopped with triorganosiloxy units, for example trimethylsiloxane, dimethylvinylsiloxane, phenyldimethylsiloxane or dimethyloctylsiloxane units. The preferred polydiorganosiloxanes (1) are copolymers comprising dimethylsiloxy and methylvinylsiloxy units, any end stopping units being trimethylsiloxane or dimethylvinylsiloxane units.

Component (1) may comprise one or a mixture of polydiorganosiloxanes. When a mixture is employed one or more of the constituent polydiorganosiloxanes may have viscosities outside the specified range of 50 to 4000 cS provided that the viscosity of the mixture is within said range.

As component (2) of the compositions there are employed organohydrogenpolysiloxanes having on average at least three silicon-bonded hydrogen atoms per molecule, the organic radicals being selected from methyl, ethyl and phenyl. The organopolysiloxanes (2) may be homopolymers or copolymers. Thus they may comprise units of the formula RHSiO wherein R is methyl, ethyl or phenyl, alone or in combination with copolymeric difunctional $(R_2SiO)$ units and/or monofunctional $(R_2HSiO_{0.5}$ or $R_3SiO_{0.5})$ units provided that any $R_2SiO$ units constitute no more than about 20 more per cent of the total units. They are preferably relatively low molecular weight materials but may have molecular weights up to 20,000 or more provided the upper viscosity limit of the total composition is not exceeded. Preferred as component (2) are the methylhydrogen polysiloxanes. Particularly preferred are those consisting of units of the formula (CH$_3$)H SiO end-stopped with trimethylsiloxy units and having average molecular weights within the range from 1,200 to 3,500.

Components (1) and (2) are employed in the composition in relative proportions which provide for the presence of at least 0.5 silicon-bonded hydrogen atom for every silicon-bonded vinyl radical. Most preferably, the ratio of silicon-bonded hydrogen atoms provided by (2) to vinyl radicals provided by (1) is from 1:1 to 3:1. A preferred composition for use in accordance with the invention comprises by weight from about 90 to about 98 parts of a copolymer of dimethylsiloxane units and methylvinylsiloxane units having a viscosity of from 300 to 700 cS at 25°C, from 2 to 10 parts of a trimethylsilyl end-stopped methylhydrogen polysiloxane and the rhodium catalyst.

The catalyst (3) of the compositions employed herein is a sulphur-containing rhodium complex having the formula (i) or a rhodium-carbonyl complex of the general formula (ii). If desired, the catalyst (3) may comprise both types of complex. In the general formulae (i) and (ii) each X may represent a halogen atom, preferably the chlorine atom. The R substituents in formula (i) may be the same or different in any given complex and may be alkyl, aryl, aralkyl or alkaryl radicals having from 1 to 8 inclusive carbon atoms, for example, methyl, ethyl, n-butyl, hexyl, phenyl, tolyl and benzyl. The R substituents may also represent R'$_3$SiQ- groups in which Q represents a divalent aliphatic hydrocarbon radical having from 1 to 6 inclusive carbon atoms, e.g. —CH$_2$—, —CH$_2$CH$_2$— and —CH$_2$CHCH$_3$CH$_2$—, and each R' represents an alkyl, aryl, aralkyl or alkaryl radical as defined and exemplified for R, or one R' substituent may represent a trimethylsilyl radical.

Sulphur-containing complexes having the general formula (i) in which the R substituents do not contain silicon are known substances and may be prepared, for example, according to the disclosure in Jour. Chem. Soc., (A), (1971), 899. Complexes having the general formula (i) which contain silicon may be prepared by reacting together a rhodium halide RhX$_3$ and a silicon-containing sulphide R$_2$S, preferably in the presence of a polar solvent, as described in our co-pending application No. 438,123, filed Jan. 30, 1974, now U.S. Pat. No. 3,890,359, issued June 17, 1975. The carbonyl complexes having the general formula (ii) are known substances and may be prepared, as described in J. Chem. Soc., 1965, 1900.

The preferred rhodium complexes for use as the catalyst (3) are those having the general formula (i) wherein each R represents an alkyl radical having from 1 to 4 inclusive carbon atoms or the (CH$_3$)$_3$SiCH$_2$— group and each X represents a chlorine atom.

The catalyst (3) is employed in a proportion which is sufficient to give the rate of cure desired in the composition. In general the catalyst is best employed in a proportion which provides from about 5 to about 40 parts by weight of rhodium, as the metal, per million parts of the combined weights of components (1) and (2). More than 40 parts of rhodium may be employed if desired but such relatively large amounts could have an unfavourable effect on the economics of the process. Less than 5 parts of rhodium may also be employed but will lead to extended cure times.

Compositions for use in the process of this invention may be prepared by merely mixing components (1), (2) and (3). Compositions obtained by mixing (1), (2) and (3) are novel and are included within the scope of this invention. In view of the relatively small proportion of (3) employed addition and dispersion of this component is facilitated if it is added as a solution or dispersion in a liquid carrier, e.g. methanol, ethanol or toluene. The amount of volatile liquid carrier incorporated into the composition for this, or any other, purpose, should not however exceed about 3% by weight based on the total weight of the composition if the advantages of employing a substantially solvent-free composition are to be retained.

The composition comprising (1), (2) and (3) should have a viscosity not exceeding 4000 cS at 25°C. Compositions having viscosities in excess of 4000 cS are not adapted to the coating process of this invention. Preferably the composition has a viscosity within the range from 100 to 500 cS at 25°C.

The process of this invention may be employed to provide a release surface on a wide range of substrates, for example, aluminium, polyethylene terephthalate and polyethylene. It is particularly applicable to the treatment of various types of paper e.g. Kraft, glassine and vegetable parchment.

Application of the composition to the substrate may be carried out employing any suitable technique, for example by immersion, doctor blade or gravure or plain roll. The quantity of composition applied to the surface is not critical and may be varied between wide limits. For most purposes it is preferred to adjust the coating conditions to achieve an add-on of about 0.2 to 4.0 grams of composition per square meter of surface.

After application the applied composition is cured, preferably by the application of heat. The curing conditions employed will vary to some extent depending on the specific catalyst, the proportion in which it is employed and on the nature of the substrate. Generally, at catalyst levels corresponding to about 20 p.p.m. of rhodium, based on the composition, exposure of the coated substrate to a temperature in the range from 100° to 180°C for a period of from 5 to 60 seconds is sufficient to achieve a satisfactory degree of cure.

The following examples in which the parts are expressed by weight, Me = methyl, Et = ethyl and Bu =n-butyl illustrate the invention.

EXAMPLE 1

A coating composition was prepared by mixing together 97 parts of a trimethylsiloxy end-stopped copolymer of 98 mole per cent dimethylsiloxane units and 2 mole per cent methylvinylsiloxane units (viscosity 380 cS at 25°C) and 3 parts of a trimethylsiloxy end-stopped methylhydrogen polysiloxane having a molecular weight of approximately 2,500. The composition was divided into a number of portions. Each portion was catalysed by adding one of the following catalyst solutions in an amount sufficient to provide 20 parts of rhodium per million parts of composition.

| Catalyst Solution | | |
|---|---|---|
| A | RhCl₃(Et₂S)₃ | in Toluene (0.0242 g./ml.) |
| " | B RhCl₃(EtSCH₂SiMe₃)₃ | in Toluene (0.1167 g./ml.) |
| " | C RhCl₃.3H₂O | in Ethanol (0.0763 g./ml.) |
| " | D RhCl₃(BuSCH₂SiMe₃)₃ | in Toluene (0.372 g./ml.) |
| " | E Rh₂(CO)₄Cl₂ | in Toluene /C₆H₆ (0.0171 g./ml.) |
| " | F (C₂H₄)₂Rh(MeCOCHCOMe) | in CHCl₃ (0.0169 g./ml.) |
| " | G RhCl₃(Bu₂S)₃ | in Toluene (0.1329 g./ml.) |

For comparison, a platinum-catalysed bath was prepared as follows. Two mixtures were made up. The first contained 47 parts of the vinyl-containing polysiloxane and 3 parts of the methylhydrogenpolysiloxane used in the rhodium catalysed compositions described above and 0.1 part of methylethyl ketoxime. The second mixture contained 50 parts of the same vinyl-containing polysiloxane, 0.1 part of methylethyl ketoxime and sufficient of a chloroplatinic acid-containing catalyst to provide 20 parts of platinum per million parts total composition in the two mixtures. The mixtures were allowed to stand for 30 minutes and then combined with vigorous stirring.

The catalysed compositions were employed 15 minutes after preparation to coat samples of pre-sized Kraft paper using a glass rod drawn down over a rubber base. This application method resulted in a siloxane pick-up of about 5g. per square meter of paper. The samples were then exposed to temperatures of 120° or 140°C and the cure time at these temperatures determined by rubbing the coating with the index finger. The cure time was determined as the minimum time required for the coating to achieve the state at which no smearing occurred. The results obtained are shown in the following table.

| Catalyst Solution | Time for Cure (sec.) | |
|---|---|---|
| | 140°C | 120°C |
| A | 20 | 40 |
| B | 10–15 | 30 |
| *C | >60 | — |
| D | 10 | 45 |
| E | 20 | 45 |
| *F | 10(a) | 25 |
| G | 15 | 25 |
| *Pt Catalyst | 20 | No cure |

*Included for comparison.
(a)Coating bath gelled in less than 6 hours.

The results indicate the superior curing characteristics at lower temperatures of catalysts A, B, C, D, E and G of this invention. Although the platinum catalysed composition cured in 20 seconds at 140°C no cure occurred at 120°C. Catalyst F caused rapid cure at both 140°C and 120°C but the coating bath gelled and became unusable in less than 6 hours. The coating baths prepared with Catalysts A, B, D, E and G remained usable for more than 6 hours.

EXAMPLE 2

100 Parts of a dimethylvinylsiloxy terminated copolymer of 98.2 mole per cent dimethylsiloxane units and 1.8 mole per cent methylvinylsiloxane units (viscosity 350 cS at 25°C) were mixed with 5.8 parts of a trimethylsiloxy end-stopped methylhydrogen polysiloxane having a molecular weight of approximately 2,500. The composition was catalysed by the addition of sufficient of a 3% by weight solution in toluene of RhCl₃(Bu₂S)₃ to provide 40 parts of rhodium per million of total composition.

The composition thus obtained was applied by Meyer rod to samples of aluminium foil, Melinex (polyethylene terephthalate) film and polyethylene coated paper at levels of about 1 g. and 6 g. per square meter of substrate. The coated samples were then placed in an oven at 120°C for 60 seconds. When removed from the oven each of the substrates had a cured coating which was non-adherent to adhesive tapes and other sticky substances.

The coating bath remained usable for at least 24 hours.

EXAMPLE 3

When, in the procedure of Example 2, the solution of RhCl₃ (Bu₂S)₃ was replaced by sufficient of a solution of RhCl₃[SEt(CH₂SiMe₂SiMe₃)]₃ or

RhCl₃[SBu(CH₂C₆H₅)]₃ to give an equivalent amount of rhodium (40 p.p.m.) similar results were obtained.

That which is claimed is:

1. A composition having a viscosity not exceeding 4,000 cS at 25°C and comprising (1) a polydiorganosiloxane having a viscosity in the range from 50 to 4,000 cS at 25°C wherein from 0.1 to 15 per cent of the total silicon-bonded radicals are vinyl radicals, there being at least two vinyl radicals per molecule and at least 80 per cent of the remaining silicon-bonded radicals being methyl radicals (2) an organohydrogenpolysiloxane having therein silicon-bonded hydrogen atoms and silicon-bonded organic radicals selected from methyl, ethyl and phenyl radicals, there being in the molecule on average at least three silicon-bonded hydrogen atoms, and no more than 20 molar per cent of copolymeric diorganosiloxane units, and (3) a catalyst for the addition of ≡SiH groups to silicon-bonded vinyl groups, said catalyst comprising one or more complexes of rhodium having the general formula RhX₃(SR₂)₃     (i)

or

Rh₂(CO)₄X₂     (ii)

wherein each X represents a halogen atom and each R represents an alkyl, aryl, aralkyl or alkaryl radical having from 1 to 8 inclusive carbon atoms or the R'₃SiQ-group in which Q represents a divalent aliphatic hydrocarbon radical having from 1 to 6 inclusive carbon atoms or a (CH₃)₃Si— group not more than one R' per molecule being (CH₃)₃Si—, the ratio of silicon-bonded hydrogen atoms provided by (2) to silicon-bonded vinyl radicals provided by (1) being at least 0.5:1.

2. A composition as claimed in claim 1 said composition having a viscosity in the range from 100 to 500 cS at 25°C.

3. A composition as claimed in claim 1 in which the polydiorganosiloxane (1) is a copolymer comprising methylvinylsiloxane units and dimethylsiloxane units, any end-stopping units being trimethylsiloxane units or dimethylvinylsiloxane units.

4. A composition as claimed in claim 3 in which the vinyl radicals constitute from 0.1 to 5 per cent of the total organic radicals in the polydiorganosiloxane (1).

* * * * *